US009514066B1

(12) United States Patent
Diaz et al.

(10) Patent No.: US 9,514,066 B1
(45) Date of Patent: Dec. 6, 2016

(54) RECONFIGURABLE INTERFACE AND METHOD OF CONFIGURING A RECONFIGURABLE INTERFACE

(71) Applicant: MOTOROLA SOLUTIONS, INC., Schaumburg, IL (US)

(72) Inventors: Edward A. Diaz, Miami, FL (US); Johnny R. Ferreira, Sunrise, FL (US); Ricardo Franco, Plantation, FL (US); Charles R. Ruelke, Coral Springs, FL (US); Matthew E. Simms, Davie, FL (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 14/849,535

(22) Filed: Sep. 9, 2015

(51) Int. Cl.
*G06F 3/00* (2006.01)
*G06F 13/10* (2006.01)
*G06F 13/20* (2006.01)
*G06F 13/40* (2006.01)

(52) U.S. Cl.
CPC ............. *G06F 13/102* (2013.01); *G06F 13/20* (2013.01); *G06F 13/4068* (2013.01)

(58) Field of Classification Search
None
See application file for complete search history.

(56) References Cited

U.S. PATENT DOCUMENTS

| 4,619,816 | A | 10/1986 | Rickelton | |
| 5,386,518 | A * | 1/1995 | Reagle | G06F 13/385 710/316 |
| 5,938,742 | A | 8/1999 | Faddell et al. | |
| 6,553,489 | B1 * | 4/2003 | Osler | H04L 29/06 710/10 |
| 6,633,994 | B1 * | 10/2003 | Hofmann | G06F 1/12 710/306 |
| 7,398,336 | B2 * | 7/2008 | Feng | G06F 13/4004 307/112 |
| 7,516,211 | B1 * | 4/2009 | Gourlay | H04L 41/0816 370/356 |
| 7,583,725 | B1 * | 9/2009 | Dick | H04L 1/0033 375/219 |
| 8,295,163 | B1 * | 10/2012 | Schmalz | H04L 43/0811 324/533 |
| 8,902,956 | B2 | 12/2014 | Thomas et al. | |
| 8,996,772 | B1 | 3/2015 | Raza et al. | |
| 9,003,068 | B2 | 4/2015 | Cadigan et al. | |
| 2005/0204070 | A1 * | 9/2005 | Shaver | G06F 1/266 710/8 |
| 2008/0031238 | A1 * | 2/2008 | Harmelin | H04L 41/0843 370/389 |
| 2013/0120032 | A1 * | 5/2013 | Quiquempoix | G06F 13/4282 327/142 |
| 2015/0067206 | A1 * | 3/2015 | Luo | G06F 13/4282 710/105 |
| 2015/0134862 | A1 * | 5/2015 | Sthoeger | G06F 13/4291 710/105 |

OTHER PUBLICATIONS

Texas Instruments, "TMS320C6000 DSP Multichannel Buffered Serial Port (McBSP)," reference guide (2006) p. 1-88, SPRU580G, Dallas.

* cited by examiner

*Primary Examiner* — Elias Mamo
(74) *Attorney, Agent, or Firm* — Michael Best & Friedrich LLP

(57) ABSTRACT

A real-time reconfigurable input/output interface of a controller and a method of reconfiguring the same. The reconfigurable interface enables the controller to communicate with a plurality of peripheral digital subsystem blocks, and includes an input/output interface, a profile memory, and a state machine. The input/output interface includes a plurality of data lines including a shared portion that are shared among the plurality of peripheral digital subsystem blocks. The profile memory stores a plurality of interface profiles, each interface profile defining a configuration of the input/output interface to communicate with an associated one of the peripheral blocks. The state machine is coupled to the profile memory to receive interface profiles and to the input/output interface. In response to each request to communicate with a particular peripheral block, the state machine configures the input/output interface according to the interface profile associated with the particular peripheral block.

22 Claims, 9 Drawing Sheets

RECONFIGURABLE INTERFACE AND METHOD OF CONFIGURING A RECONFIGURABLE INTERFACE

BACKGROUND OF THE INVENTION

A wide variety of electronic devices are available on the market today. Example electronic devices include communication devices, such as two-way radios, mobile telephones, smart phones, tablets, personal digital assistants (PDAs), digital media players, to name a few. The electronic devices typically include one or more controllers for carrying out desired functionally of each device. These controllers may be, for example, platform application specific integrated circuits (platform ASICs). The controllers interface with peripheral devices to assist in accomplishing the various functions of the controller. Each peripheral device can have a different communication interface compliant to one or more specific protocols. Each peripheral communication protocol may stipulate a particular number of input/output physical interconnections, each interconnection conveying various digital signals using different clocking strategies, different frequency data transmissions, and different data packet sizes, among other variations. Typically, a controller is coupled to each peripheral device using dedicated pins for data communications, for one or more clock signals, and for a chip select signal. With an ever increasing need for controllers to connect to more and varying peripheral devices, the number of pins required on controllers is increasing. An increase in the number of pins can increase the size, cost, power requirements, and design complexity of the controller.

Accordingly, there is a need for improved systems and methods for a real-time reconfigurable serial input/output interface of a controller.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
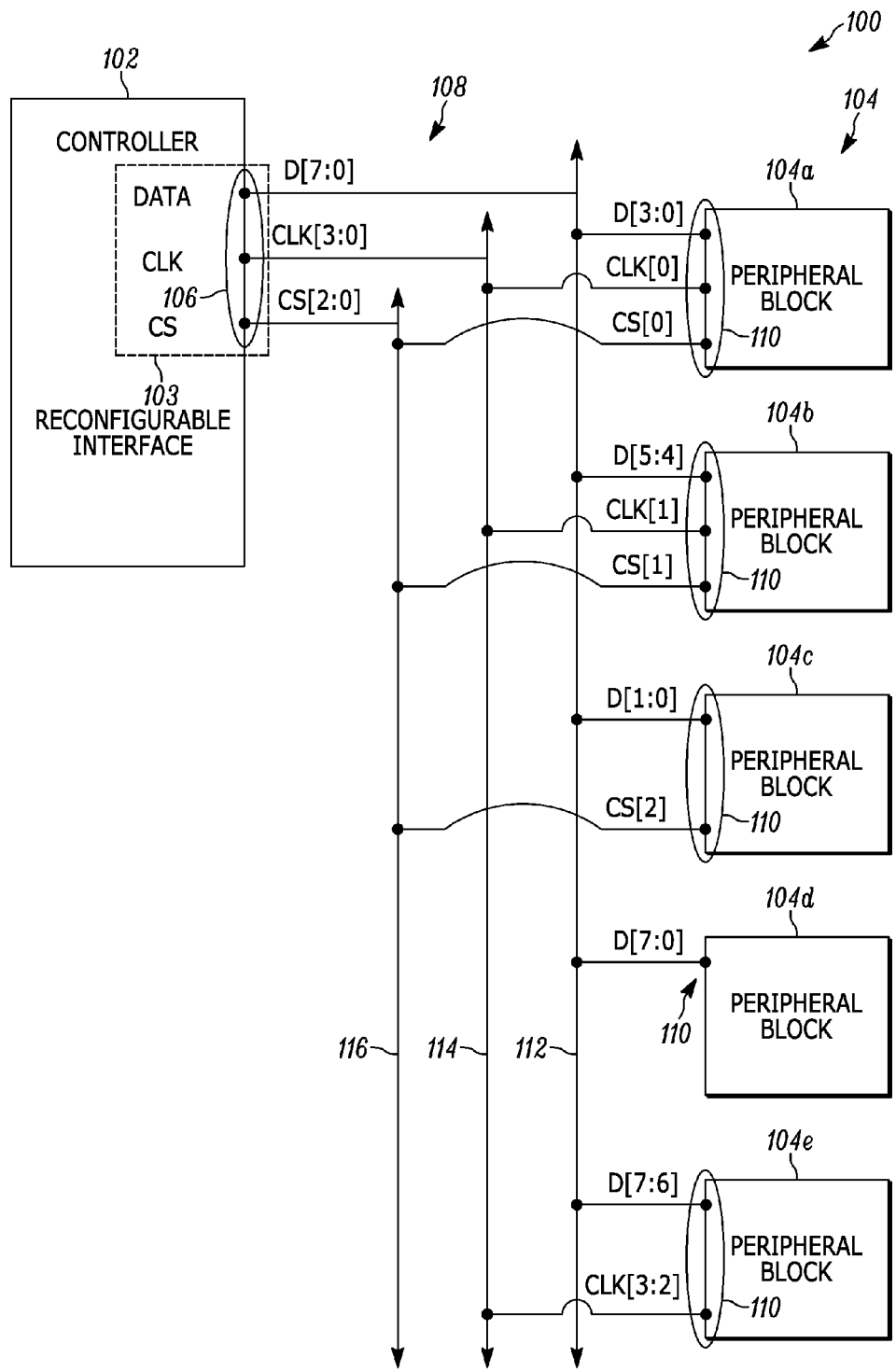
FIG. 1 illustrates a processing system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one embodiment, the invention provides a reconfigurable interface used to communicate with a plurality of peripheral digital subsystem blocks. The reconfigurable interface includes an input/output interface, a profile memory, and a state machine. The input/output interface includes a plurality of data lines. The plurality of data lines include a shared portion of data lines that are shared among the plurality of peripheral digital subsystem blocks. The profile memory stores a plurality of interface profiles, each interface profile defining a configuration of the input/output interface to communicate with an associated one of the plurality of interface profiles. The state machine is coupled to the profile memory and to the input/output interface. The state machine is configured to, in response to a first request to communicate with a first peripheral digital subsystem block, configure the input/output interface according to a first interface profile of the plurality of interface profiles. The state machine is further configured to, in response to a second request to communicate with a second peripheral digital subsystem block, configure the input/output interface according to a second interface profile of the plurality of interface profiles.

In another embodiment, the invention provides a method for reconfiguring a reconfigurable interface used to communicate with a plurality of peripheral digital subsystem blocks. The method includes receiving a first request to communicate with a first peripheral digital subsystem block. In response to receiving the first request, the method includes configuring an input/output interface of the reconfigurable interface according to a first interface profile, and communicating with the first peripheral digital subsystem block over a first portion of data lines of the input/output interface. The method further includes receiving a second request to communicate with a second peripheral digital subsystem block. In response to receiving the second request, the method includes configuring the input/output interface of the reconfigurable interface according to a second interface profile, and communicating with the second peripheral digital subsystem block over a second portion of data lines of the input/output interface, the second portion of data lines including at least one shared data line of the first portion of data lines.

FIG. 1 illustrates a processing system 100 including a controller 102 including a reconfigurable interface 103. The controller 102 is coupled, via the reconfigurable interface 103, to a plurality of peripheral digital subsystem blocks (peripheral blocks) 104, referred to individually as peripheral blocks 104a, 104b, 104c, 104d, and 104e. The number of peripheral blocks 104 shown is exemplary, as some embodiments may include more or fewer peripheral blocks 104 coupled to the controller 102. The controller 102 is, for example, a platform application specific integrated circuit (platform ASIC).

The reconfigurable interface 103 includes pins (or leads) 106 that are connected by a plurality of communication lines 108 to peripheral pins 110 of the peripheral blocks 104. The communication lines 108 are, for example, conductive traces on a printed circuit board, conductive wires, or a combination of both. The communication lines 108 may be soldered or otherwise secured to the pins 106 and peripheral pins 110. In some instances, the controller 102 and peripheral blocks 104 are mounted on a single printed circuit board or on two or more printed circuit boards. For example, the controller 102 and a portion of the peripheral blocks 104 may be located on a first printed circuit board, while the other peripheral blocks 104 are located on a second printed circuit board or multiple other printed circuit boards.

The communication lines 108 include data lines 112, clock lines 114, and chip select lines 116, which may also be referred to as chip enable lines 116. The number of communication lines 108 coupling the controller 102 to a particular one of the peripheral blocks 104 varies depending on the communication protocol used by the particular peripheral block. For example, various communication protocols may use one, two, four, eight, or sixteen data lines 112; zero, one, or two clock lines 114; and zero or one chip select lines 116. Accordingly, the total number of pins 106 and communication lines 108 varies depending on the number of peripheral blocks 104 and the various communication protocols used by the peripheral blocks 104.

For purposes of this description, individual data lines interconnecting a sending (e.g., "master") and receiving (e.g., "slave") digital communication device are designated using a prefix "D" followed by a bracketed line indicator (e.g., [0]). For example, the identifiers D[0], D[1], . . . D[n] indicate, respectively, individual physical data lines 0, data line 1, and so on up to data line n. As an example, where n=15, the controller 102 has sixteen data lines 112. Multiple data lines 112 may be referred to using a colon separating line numbers in the bracketed line identifier. For example, D[7:0] refers to eight of the data lines 112 including data lines 0, 1, 2, 3, 4, 5, 6, and 7. As another example, D[4:3] refers to two of the data lines 112 including data line 4 and data line 3.

A similar labeling convention is used for the clock lines 114 such that CLK[0 ], CLK[1], . . . to CLK[m] indicates individual clock line 0, clock line 1, and so on up to clock line m. As an example, where m=3, the controller 102 includes four clock lines 114. In this example, the clock lines 114 may be referred to collectively as CLK[3:0], individually (e.g., CLK[0 ]), or as part of a sub-group (e.g., CLK [3:2]).

A similar labeling convention is used for the chip select lines 116 such that CS[0], CS[1], . . . to CS[k] indicates individual chip select line 0, chip select line 1, and so on up to chip select line k. As an example, where k=2, the controller 102 includes three chip select lines 116. In this example, the chip select lines 116 may be referred to collectively as CS[2:0], individually (e.g., CS[0]), or as part of a sub-group (e.g., CS[1:0]).

In FIG. 1, the reconfigurable interface 103 of the controller 102 includes eight data lines 112 (D[7:0]), four clock lines 114 (CLK[3:0]), and three chip select lines 116 (CS[2:0]). However, the particular type and quantity of peripheral blocks 104 and the type and number of communication lines 108 are exemplary. In other embodiments, more or fewer data lines 112, clock lines 114, and chip select lines 116 may be provided, as appropriate for the particular type and number of peripheral blocks 104 connected to the controller 102 and their communication protocols.

Example communication protocols used by the peripheral blocks 104 include a one, two, three, four, or eight wire serial peripheral interface (SPI) protocol, a synchronous serial interface (SSI) protocol, a universal asynchronous receiver/transmitter (UART) protocol, a parallel port input/output protocol, as well as other protocols. In one example, the peripheral block 104a is a peripheral device (e.g., a register set) that communicates according to a quad serial peripheral interface (QSPI) protocol and that includes four data lines 112 (D[3:0]), one clock line 114 (CLK[0]), and one chip select line 116 (CS[0]). Also in the example, the peripheral block 104b is a peripheral device that communicates according to a dual serial peripheral interface (dual SPI) protocol and that includes two data lines 112 (D[5:4]), one clock line 114 (CLK[1]), and one chip select line 116 (CS[1]). Further in the example, the peripheral block 104c is a peripheral device that communicates according to a universal asynchronous receiver/transceiver (UART) protocol and that includes two data lines 112 (D[1:0]), no clock signal line, and one chip select line 116 (CS[2]). In the example, the peripheral block 104d is a peripheral device that communicates according to a parallel port input/output (TO) protocol (e.g., DigRF$^{SM}$) and that includes eight data lines 112 (D[7:0]) forming four differential data line pairs, no clock signal line, and no chip select line. Continuing with the example, the peripheral block 104e is a peripheral device that communicates according to a two-wire serial data communication protocol and that includes two data lines 112 (D[7:6]), two clock lines 114 (CLK[3:2]) forming a differential clock line pair, and no chip select line.

Figure 2:
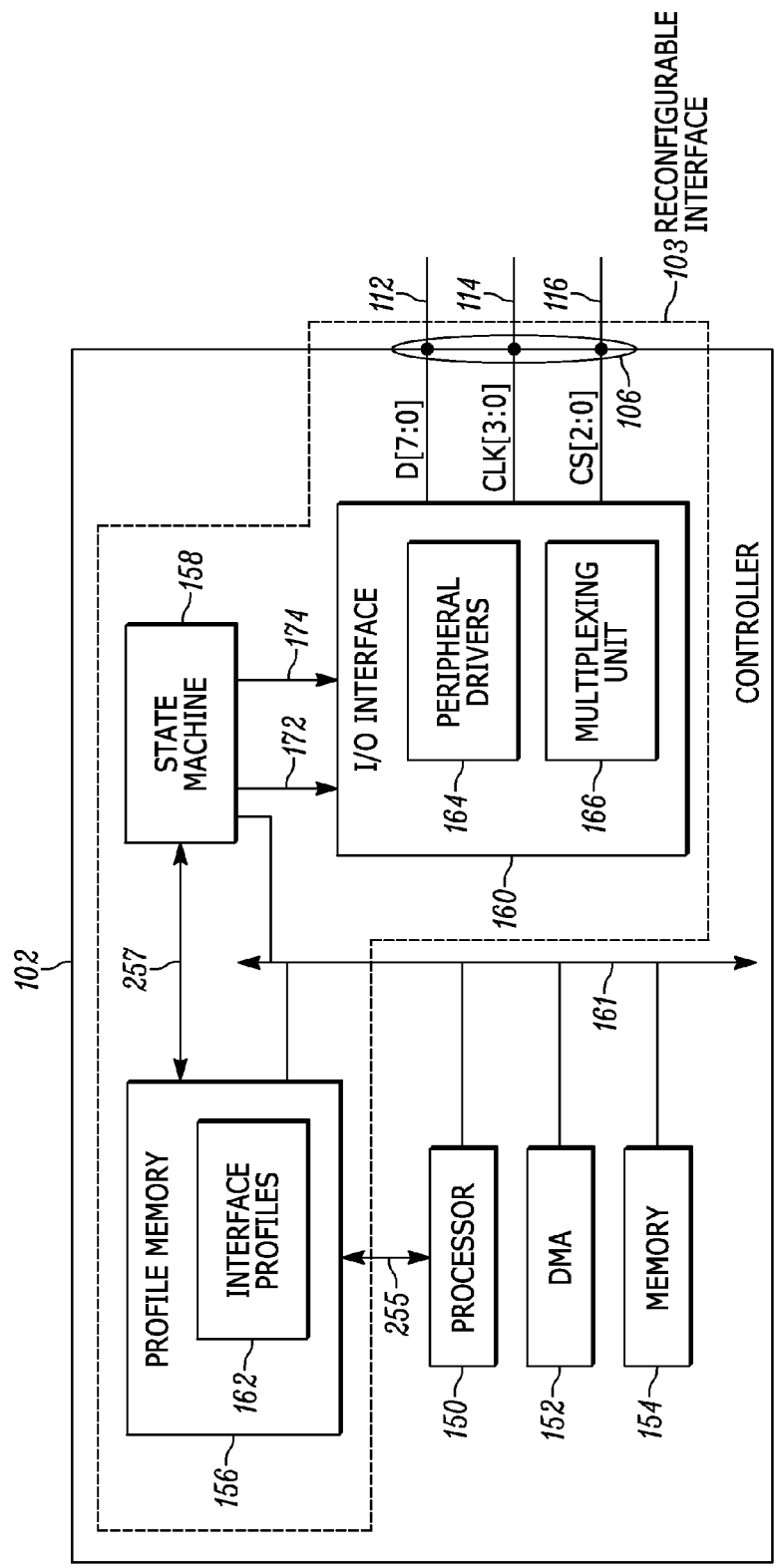
FIG. 2 illustrates a reconfigurable interface of a controller of the processing system of FIG. 1 in accordance with some embodiments.

FIG. 2 illustrates the controller 102 and reconfigurable interface 103 in greater detail. As illustrated, the controller 102 includes a processor 150, a direct memory access (DMA) 152, a memory 154, a profile memory 156, a state machine 158, an input/output (I/O) interface 160, and the pins 106. The pins 106 are physical interface pins. As illustrated, the profile memory 156, the state machine 158, the input/output interface 160, and the pins 106 are part of the reconfigurable interface 103 of the controller 102. A communications bus 161 connects the components of the controller 102 to enable communication between the components.

The memory 154 is, for example, random access memory (RAM) implementing a layer 2 (L2) cache for the processor 150 or a non-cacheable memory. The processor 150 is a processing unit, such as a microprocessor, that reads and writes operational data and instructions to and from the memory 154 and executes instructions. The processor 150 includes various processing elements (e.g., arithmetic logic units) and memory elements (e.g., layer 1 (L1) cache and registers) to carry out processing functions. In some embodiments, the processor 150 is a logic state machine, separate from the state machine 158, that carries out various encoded functions.

The DMA 152 includes a DMA controller (not shown) that controls data transfers from the memory 154 and to peripheral blocks 104 and other components of the controller 102 to reduce demands on the processor 150. For example, the processor 150 may specify to the DMA 152 a block of data to be transferred and a destination device to which the data should be transferred, and the DMA 152 will control the actual data transfer.

The profile memory 156 stores a plurality of interface profiles 162, one for each type of peripheral block communication protocol that one of the peripheral blocks 104 may use. The profile memory 156 is a set of registers or another data storing memory device. As illustrated, the profile memory 156 is a separate memory device from the memory 154. However, in some embodiments, the profile memory 156 is incorporated into a portion of the memory 154 (e.g., a dedicated section of the memory 154) or another multipurpose memory device.

The state machine 158 is a sequential logic circuit that receives at least one of the interface profiles 162 from the profile memory 156 and configures the input/output interface 160 in accordance with the interface profiles 162 received. Each interface profile 162 defines a configuration of the input/output interface 160 to enable communication between the controller 102 and one of the peripheral blocks 104. More particularly, the state machine 158 sends configuration signals to the input/output interface 160 to configure peripheral drivers 164 and a multiplexing unit 166 of the input/output interface 160.

Figure 3:
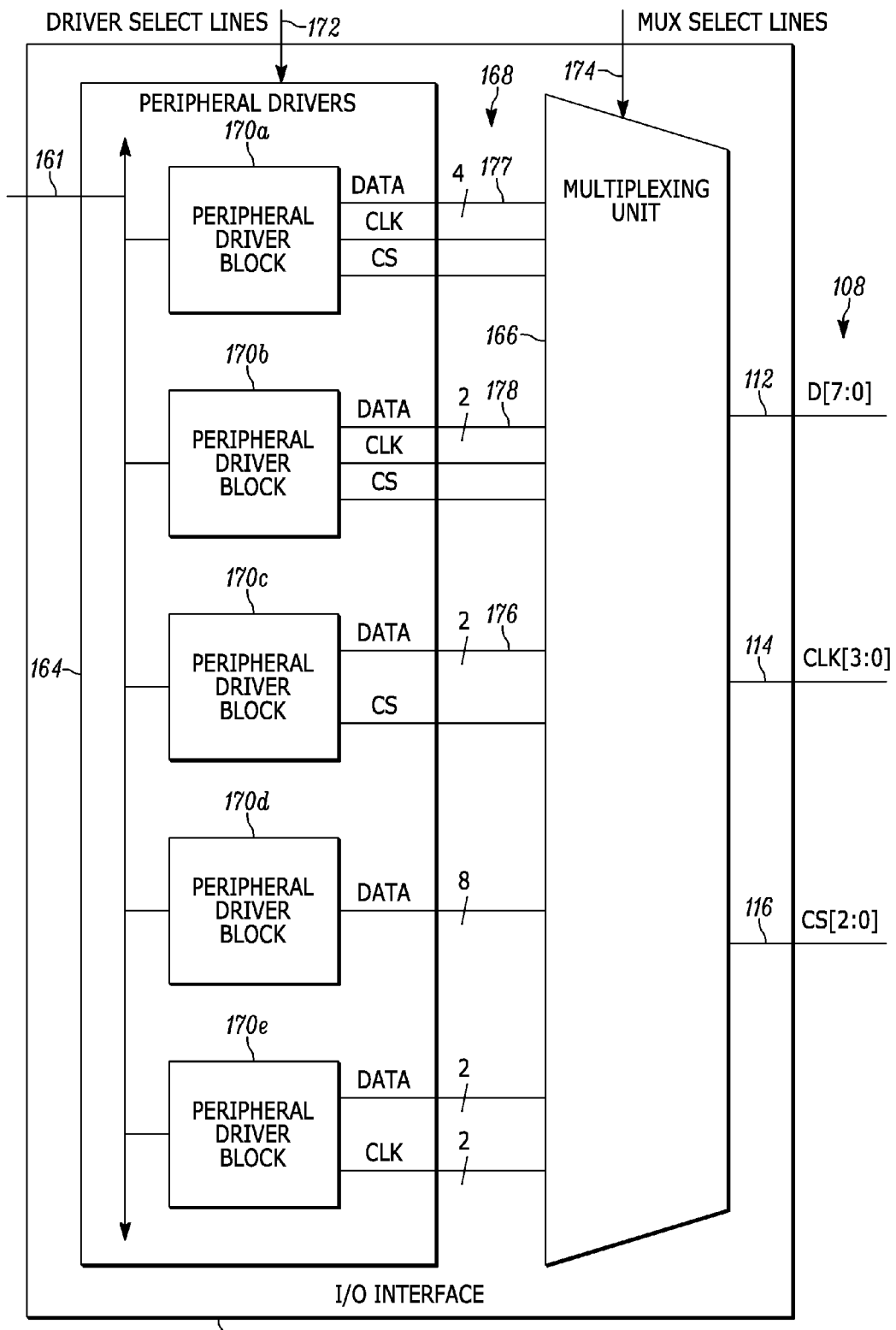
FIG. 3 illustrates an input/output interface of the processing system of FIG. 1 in accordance with some embodiments.

FIG. 3 illustrates the input/output interface 160 in greater detail. The peripheral drivers 164 of the input/output interface 160 are coupled to the communications bus 161 and, via driver lines 168, to the multiplexing unit 166. The multiplexing unit 166 is coupled to the data lines 112, the clock lines 114, and the chip select lines 116. Additionally, the peripheral drivers 164 and the multiplexing unit 166 are each coupled to the state machine 158 to receive configuration signals.

The peripheral drivers 164 of FIG. 3 include a plurality of peripheral driver blocks 170a through 170e, collectively referred to as peripheral driver blocks 170. The peripheral driver blocks 170 each provide a protocol-specific interface between the communications bus 161 and the communication lines 108. The peripheral driver blocks 170 include logic circuitry to translate communications between a controller-side protocol used on the communications bus 161 and peripheral-side protocols used to communicate with the peripheral blocks 104 (not shown in FIG. 3). For example, the peripheral driver blocks 170 communicate on the controller side of the input/output interface 160 (e.g., with the memory 154 of FIG. 2 via communications bus 161) using an internal controller communication protocol and communicate on the peripheral-side of the input/output interface 160 (e.g., via the driver lines 168) using a protocol specific to a particular one of the peripheral blocks 104.

Each of the peripheral driver blocks 170 may include one or more of a data buffer, a clock generator circuit, and chip select generator circuit (not shown in FIG. 3). The data buffer may be used to buffer data being communicated between the controller 102 and one of the peripheral blocks 104. The clock generator circuit provides one or more clock signals appropriate for the particular protocol of the particular peripheral driver block 170. Further, the chip select generator circuit provides a chip select signal, which is used to enable or activate a particular one of the peripheral blocks 104 for communication. Accordingly, the signals provided over the chip select, clock, and data lines of the driver lines 168 at the output of each of the peripheral driver blocks 170 are compliant with the protocol governing the peripheral block 104 associated with each particular peripheral driver block 170.

As noted, FIG. 3 illustrates the input/output interface 160 in further detail. The following discussion of the input/output interface 160, however, also refers to FIGS. 1 and 2 to reference some of the components that are used in conjunction with the input/output interface 160, including the profile memory 156 and the memory 154 of FIG. 2, as well as the peripheral blocks 104 of FIG. 1.

Returning to FIG. 3, as an example, the peripheral driver block 170a may receive a sixteen bit word of data over the communications bus 161 from the memory 154 (shown in FIG. 2), the data to be transmitted over four data lines 112 to the peripheral block 104a (shown in FIG. 1). The peripheral driver block 170a stores the sixteen bit word of data in the data buffer, and then transmits the sixteen bit word of data in groups of four bits, each group being transmitted sequentially over the four data lines, i.e., over four clock cycles. The clock generator circuit provides appropriate clock signals to the peripheral block 104a according to the particular communication protocol and the chip select generator circuit provides a chip select signal to the peripheral block 104a so that the peripheral block 104a is enabled and receives the transmitted data.

In this same example, the peripheral driver 170b may receive another sixteen bit word of data over communications bus 161 from the memory 154 (shown in FIG. 2) and transfer the data to the peripheral block 104b (shown in FIG. 1) two bits at a time over eight clock cycles using two data lines 112 and with a clock signal having a different frequency than generated by the peripheral driver block 170a. The peripheral driver blocks 170 may also buffer data received over the data lines 112 from the peripheral blocks 104 to form sixteen bit words before transmitting the data on to the memory 154 over communications bus 161. The particular word size and number of data lines 112, clock lines 114, and chip select lines 116 used in the example are merely for illustration, as word sizes, data line quantities, clocking strategies (e.g., single line versus differential), and chip select line usage can change depending on the particular communication protocols being used.

For peripheral driver blocks 170 communicating asynchronously, the clock generator circuit may not be included in peripheral driver blocks 170 because no clock signal may be required for asynchronous communication protocols. For certain peripheral blocks 104 (shown in FIG. 1) that do not require a separate chip select input, the associated peripheral driver blocks 170 may not include a chip select generator circuit. Such peripheral blocks may be enabled using other techniques, such as by monitoring the data lines 112 for a particular enable code in a header data packet and, in response to identifying the particular enable code, entering an enabled state. After receipt of the enable code, a data payload may be provided over the data lines 112. Upon receipt of the particular header data packet a subsequent time over the data lines 112 (e.g., after the data payload), the peripheral block 104 may enter a disabled state. In some instances, additional switch logic (not shown) is provided for peripheral blocks 104 that do not include a chip select input. The additional switch logic can be controlled to disconnect peripheral pins 110 (shown in FIG. 1) from the data lines 112 to prevent the particular peripheral block 104 from receiving data signals not intended for the particular peripheral block 104. The additional switch logic may be controlled via a control signal similar to a chip select signal over another dedicated chip select line. Alternatively, the additional switch logic may monitor signals on the data lines 112 to detect an enable and disable command and, in response, connect or disconnect the associated peripheral pins 110 as instructed.

The peripheral drivers 164 are coupled to the state machine 158 (shown in FIG. 2) via driver select lines 172. The state machine 158, based on receiving one of the interface profiles 162 (shown in FIG. 2), sends driver configuration signals over the driver select lines 172 so as to configure the peripheral drivers 164 for the appropriate peripheral block 104 (shown in FIG. 1). For example, the driver configuration signals may select and activate one of the peripheral driver blocks 170. Additionally, the driver configuration signals may configure the activated driver block 170 to communicate with the associated peripheral block 104 using the appropriate data, clock, and chip enable signaling as specified by the communication protocol of the associated peripheral block 104. In response, the activated peripheral driver block 170 may monitor the communications bus 161 for instructions and data to communicate with one of the peripheral blocks 104.

The multiplexing unit 166 is coupled to the driver lines 168 of the peripheral driver blocks 170 on the controller side of the input/output interface 160 and, on the peripheral side, to the data lines 112, clock lines 114, and chip select lines 116 that are connected to the peripheral blocks 104 (shown in FIG. 1). The multiplexing unit 166 includes one or more multiplexing circuits that connect particular driver lines 168 to the data lines 112, clock lines 114, and chip select lines 116 in accordance with control signals received via mux select lines 174. More particularly, the particular connections made by the multiplexing unit 166 are based on multiplexor configuration signals provided by the state machine 158 (shown in FIG. 2) via the mux select lines 174 received by the multiplexing unit 166. The multiplexor configuration signals are based on a particular selected one of the interface profiles 162 that the state machine 158 receives from the profile memory 156 (shown in FIG. 2).

The multiplexing unit 166 connects or maps the twenty-five driver lines 168 from the peripheral driver blocks 170 to the fifteen communication lines 108 including the data lines 112, the clock lines 114, and the chip select lines 116. Thus, the communication lines 108 are shared among the peripheral driver blocks 170, which use the communication lines 108 to communicate according to different protocols. For example, the multiplexing unit 166 maps eight data driver lines 176 of the peripheral driver block 170d to D[7:0] of the data lines 112; maps four data driver lines 177 of the peripheral driver block 170a to D[3:0] of the data lines 112; and maps two data driver lines 178 of the peripheral driver block 170c to D[1:0] of the data lines 112. Consequently, the peripheral driver blocks 170a, 170c, and 170d share data lines D[1:0], and the peripheral driver blocks 170a and 170e also share data lines D[3:2]. The peripheral driver block 170e also uses data lines D[7:4], which are not shared by the peripheral driver blocks 170a and 170c. In this way, the eight lines D[7:0] of the data lines 112 serve as connectors for fourteen of the driver lines 168 used to transmit data to and from the peripheral driver blocks 170a, 170c, and 170d, rather than having fourteen of the data lines 112. Through this line sharing, the number of pins 106 (i.e., the pin count) on the controller 102 is reduced. The clock lines 114 may also be shared by the peripheral driver blocks 170 in a similar manner. For example, a clock line of driver lines 168 from the peripheral driver blocks 170c is mapped to clock lines CLK[2], while clock lines from the peripheral driver block 170e are mapped to clock lines CLK[3:2] so as to form a differential pair. Thus, the peripheral driver blocks 170c and 170e share CLK[2] of the clock lines 114.

Although the state machine 158 and input/output interface 160 are described as communicating over the driver select lines 172 and the mux select lines 174, in some embodiments, one or more of the configuration signals for configuring the peripheral drivers 164 and the multiplexing unit 166 are sent by the state machine 158 to the input/output interface 160 over the communications bus 161.

Figure 4:
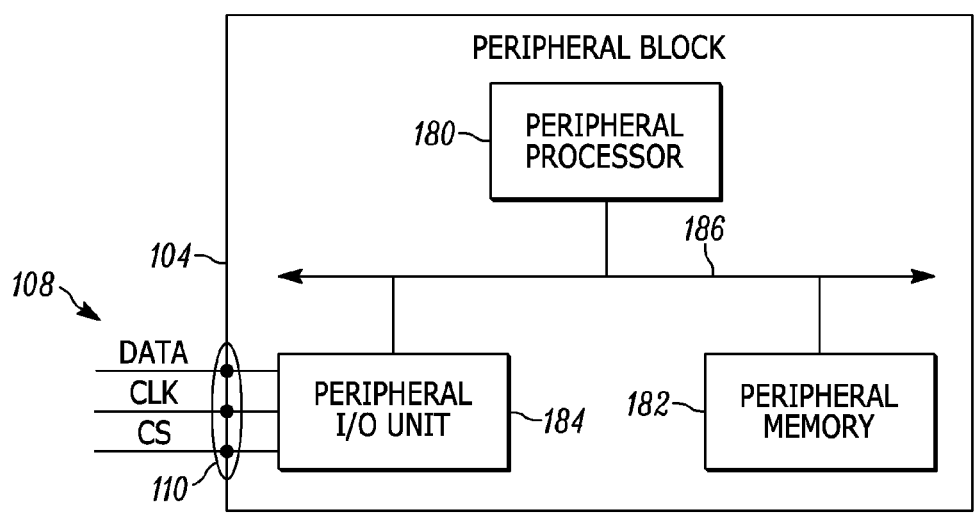
FIG. 4 a peripheral digital subsystem block of the processing system of FIG. 1 in accordance with some embodiments.

FIG. 4 illustrates an example peripheral digital subsystem block 104 including a peripheral processor 180, a peripheral memory 182, and a peripheral input/output interface 184 coupled by a peripheral bus 186. The peripheral input/output interface 184 includes driver circuitry providing an interface between the peripheral bus 186 and the communication lines 108. The peripheral processor 180, for example, executes instructions to cause the peripheral block 104 to communicate data between the peripheral memory 182 and the memory 154 of the controller 102 (shown in FIG. 2) via the peripheral input/output interface 184 and the input/output interface 160.

As noted above, certain peripheral blocks 104 are asynchronous and do not include a connection clock pin for connecting to the clock lines 114 and certain peripheral blocks 104 do not include a chip select pin for connecting and synchronizing activity on the chip select lines 116. Furthermore, the peripheral block 104 may be an integrated circuit including additional components used to form one or more of, for example, a temperature sensor, a pressure sensor, an analog-to-digital converter, a digital-to-analog converter, a touch screen, a liquid crystal display, a keyboard, a mouse, a joystick, other human input or output device, an audio codec, a digital potentiometer, a speaker, a microphone, a wireless communication circuit allowing the controller to communicate with external components and networks, a wireless security reader, a baseband processor (modem), a transceiver, a nonvolatile memory card, a register set, a flash memory, or another device.

Figure 5:
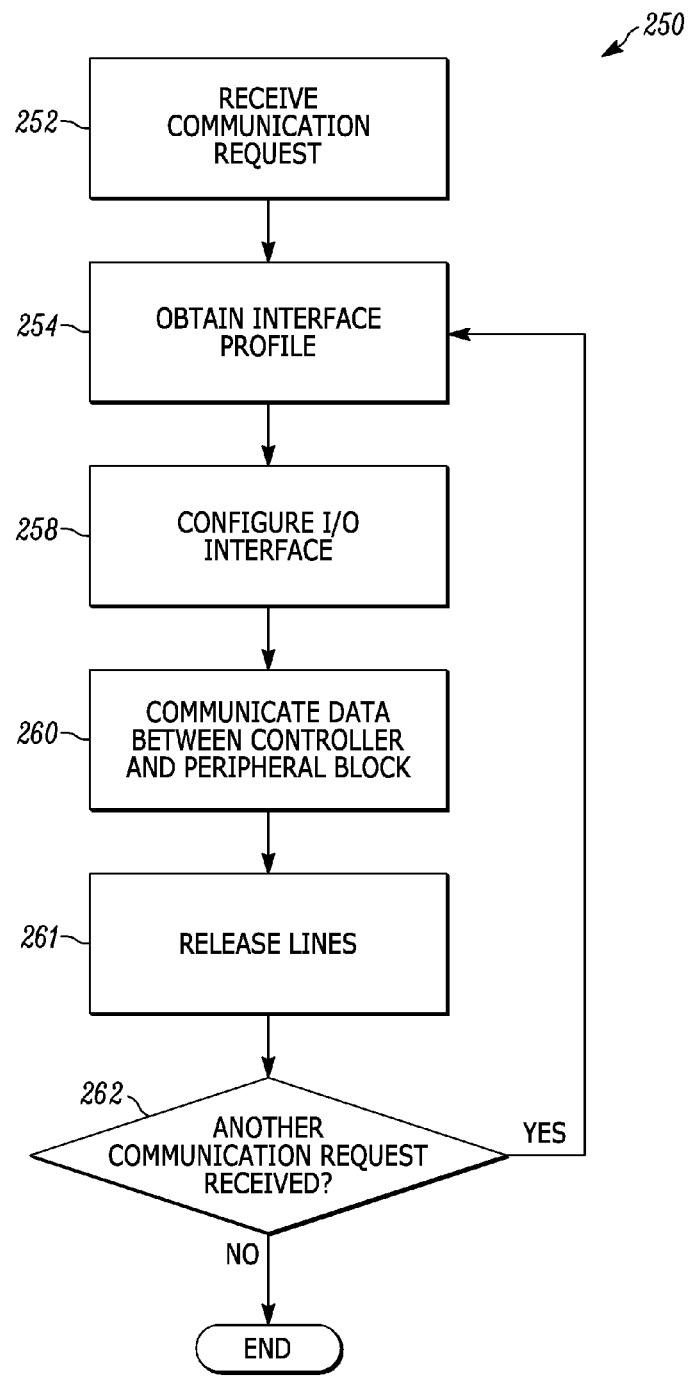
FIG. 5 is a flowchart of a method of reconfiguring of a reconfigurable interface in accordance with some embodiments.

FIG. 5 illustrates a method 250 for reconfiguring a reconfigurable interface used to communicate with a plurality of peripheral digital subsystem blocks. The method 250 is described with reference to the processing system 100 including the reconfigurable interface 103. In block 252, the controller 102 receives a request to communicate with one of the peripheral blocks 104. The request may be internally generated. For example, the processor 150 may encounter a read or write operation for communicating with one of the peripheral blocks 104 while executing program instructions. Encountering the read or write operation is one form of receiving a request to communicate. The read or write operation may be encountered through executing a main software control loop, through a software interrupt, or through a hardware interrupt (e.g., originating from a source external to the controller 102). As part of receiving the request to communicate, the processor 150 identifies the particular peripheral block 104 associated with the request (i.e., with which the controller 102 is to communicate)

In response to receiving the request to communicate, the state machine 158 obtains one of the interface profiles 162 from the profile memory 156 for the particular peripheral block 104 (block 254). To obtain the interface profile 162, the processor 150 provides an identifier for the particular peripheral block 104. For example, each interface profile 162 may have an assigned identifier (e.g., CS0, CS1, CS2, CS3, and CS4) that associated with a particular peripheral block 104. For example, CS0 may be associated with peripheral block 104a, CS1 may be associated with peripheral block 104b, and so on. The identifier may act as an address or index into the profile memory 156, and the profile memory 156 responds to receipt of the identifier by providing the associated interface profile 162 to the state machine 158. The communications between the processor 150 and the profile memory 156, as well as the communications between the profile memory 156 and the state machine 158, may occur over identifier lines 255 or profiles lines 257, respectively (see FIG. 2) or over the communications bus 161.

After obtaining the interface profile 162 in block 254, the state machine 158 configures the input/output interface 160 at block 258 in accordance with the interface profile 162. To configure the input/output interface 160, the state machine 158 outputs configuration signals to the peripheral drivers 164 and to the multiplexing unit 166. The configuration signals select a peripheral driver block 170 of the peripheral drivers 164 and selectively connect the driver lines 168 associated with the selected peripheral driver block 170 to appropriate data lines 112, clock lines 114, and chip select line 116 for communication with the particular peripheral block 104. In some instances, the configuration signals further define protocol details of the selected peripheral driver block 170. For example, the configuration signals from the state machine 158, which are based on the obtained interface profile 162 specific to a selected one of the peripheral driver blocks 170, may include, but are not limited to, one or more of the following: a particular clock frequency (e.g., 15 megahertz or 50 megahertz), receiver address (e.g., 0x500 or 0x400), a clock polarity relative to a data signal (e.g. positive or negative), clock phase (e.g., phase 0 or phase 180), chip select polarity (e.g., positive or negative enable), and the number of data lines 112 to be activated during data transmission between the controller 102 and peripheral block 104. The protocol details that are configured may vary depending on the protocol type used by a particular one of the peripheral driver blocks 170.

After the input/output interface 160 is configured according to the interface profile 162, the controller 102 communicates with the particular peripheral block 104. For example, the DMA 152 accesses the memory 154 and provides data for transmission to the particular peripheral driver block 170. The peripheral driver block 170, in turn, transmits the received data to the particular peripheral block 104 in accordance with the communication protocol of the peripheral block 104 using the physical connections defined by the interface profile 162 and configured by the state machine 158.

Alternatively, a read command is provided by the DMA 152 to a particular one of the peripheral driver blocks 170, which forwards the command to the particular peripheral block 104. In turn, the particular peripheral block 104 transmits the requested data to the peripheral driver block 170 in accordance with the communication protocol of the peripheral driver block 170 and using the physical connections configured by the state machine 158 as defined by the interface profile 162. The peripheral driver block 170 then provides the received data to the DMA 152, which writes the data to the memory 154. Accordingly, the input/output interface 160 supports bidirectional communication between the controller 102 and the peripheral blocks 104.

During the communications in block 260, the driver lines 168 remain connected to the data lines 112, clock lines 114, and chip select lines 116 as configured in step 258. In block 261, after completion of the transmission in step 260, the multiplexing unit 166 may release the data lines 112, clock lines 114, and chip select lines 116 connected to the driver lines 168 so that the input/output interface 160 may be reconfigured for a new transmission via another peripheral driver block 170.

The controller 102 proceeds to decision block 262 to determine whether another request to communicate with a peripheral block 104 has been received. If no further request has been received, the method 250 ends. However, if a further request has been received, the controller returns to block 254 to obtain the interface profile 162 associated with the peripheral block 104 with which communication has been requested.

The method 250 enables real-time reconfiguring of the input/output interface 160. In other words, the reconfiguration of the input/output interface occurs at the time a communication request is encountered. This approach contrasts with a system that may have a reprogrammable interface, but can only be programmed in advance of operation, rather than on-demand, in real-time, as described herein.

Figure 6A:
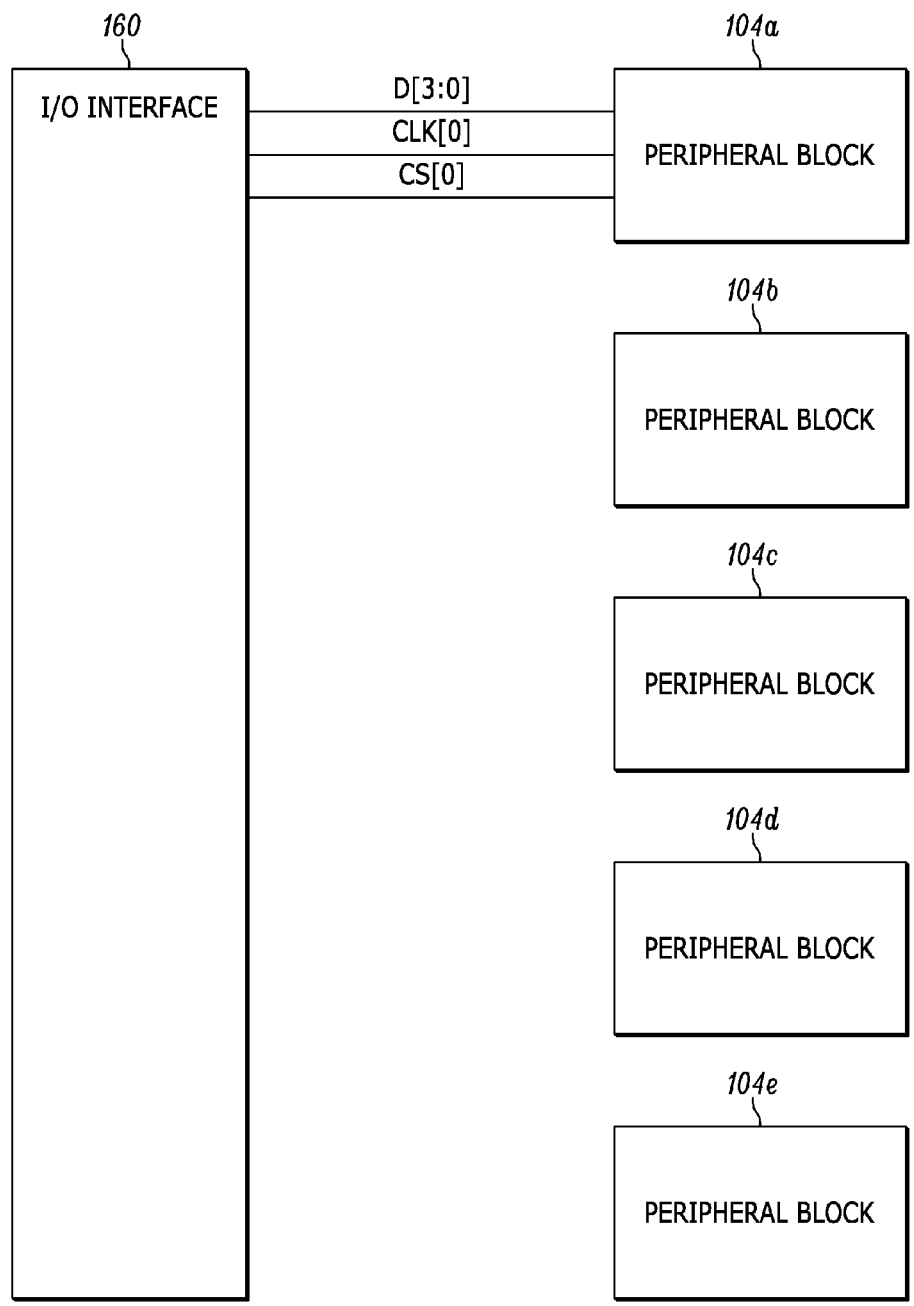
FIGS. 6A through 6C illustrate the input/output interface in exemplary interface configurations for communicating with peripheral digital subsystem blocks in accordance with some embodiments.
Figure 6B:
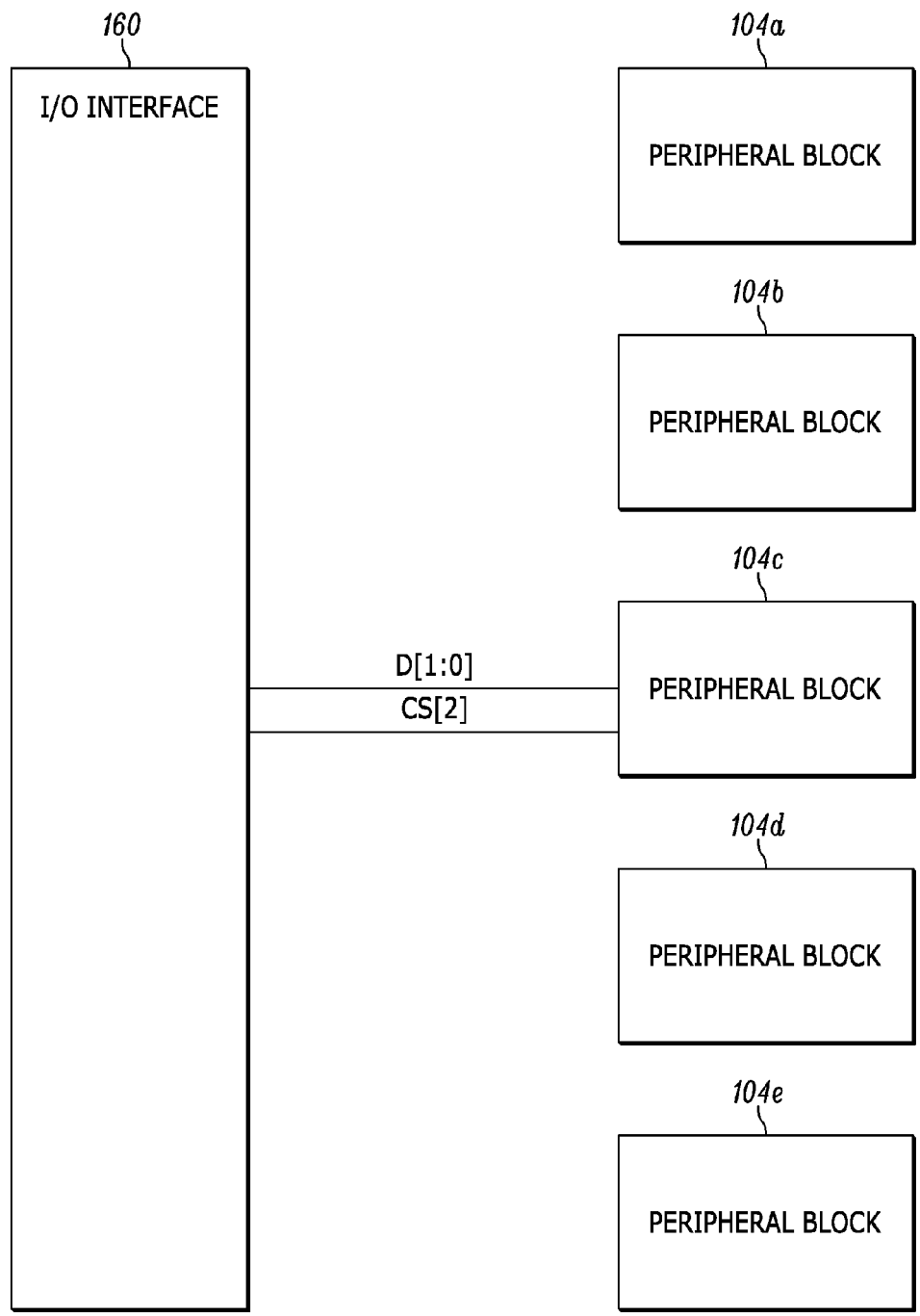
Figure 6C:
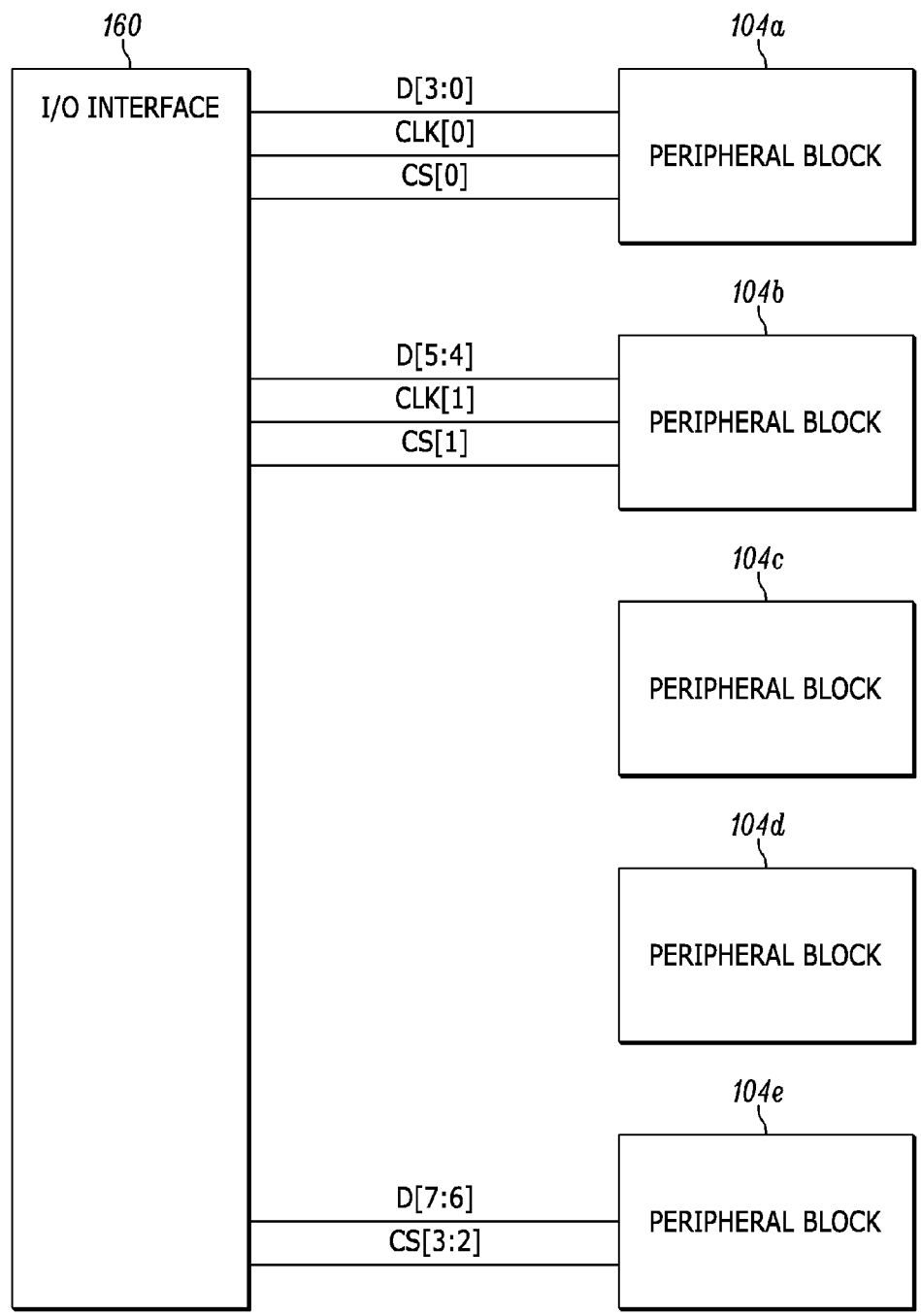

FIGS. 6A through 6C illustrate the input/output interface 160 in various exemplary interface configurations for communicating with the peripheral blocks 104. Each configuration may be achieved through an iteration of the method 250. For example, with respect to FIG. 6A, the controller 102 may receive a request to communicate with the peripheral block 104a. The state machine 158 obtains an interface profile 162 associated with the peripheral block 104a and configures the input/output interface 160. In the example of FIG. 6A, the peripheral block 104a is coupled to the input/output interface 160 via data lines D[3:0], clock line CLK[0], and chip select line CS[0]. For example, the peripheral block 104a may be a quad serial peripheral interface (QSPI) using a clock signal having a 15 megahertz frequency with a positive polarity and phase of zero degrees.

After communicating with the peripheral block 104a, the controller 102 receives a request to communicate with peripheral block 104c. The state machine 158 obtains an interface profile 162 associated with the peripheral block 104c and configures the input/output interface 160 accordingly. In the example of FIG. 6B, the peripheral block 104c is coupled to the input/output interface 160 via data lines D[1:0], clock line CLK[0], and chip select line CS[2]. As an example, the peripheral block 104c may be a dual serial peripheral interface (dual SPI) using a clock signal having a 50 megahertz frequency with a negative polarity and phase of 180 degrees.

The peripheral blocks 104a and 104c share a portion of the data lines 112 for communicating with the controller 102 and share a clock line 114. More particularly, both peripheral blocks 104a and 104c use clock line CLK[0] and use data lines D[1:0], and the peripheral block 104a further uses data lines D[3:2]. With respect to the peripheral blocks 104a and 104c, the data lines D[1:0] are a shared portion of the data lines 112 and the data lines D[3:2] are an unshared portion of the data lines 112. The chip select lines CS[0] and CS[2] are used to prevent both peripheral blocks 104a and 104c from attempting to use the same data lines simultaneously, which could lead to erroneously communication. More particularly, the chip select lines CS[0] and CS[2] are selectively enabled and disabled according to the state machine 158 configuration of the input/output interface 160. This sharing technique may also be referred to as time multiplexing. For example, when CS[0] is enabled (e.g., logic high) and CS[2] is disabled (e.g., logic low), the peripheral block 104a has access to the data lines D[3:0] and the peripheral block 104c is disabled or simply ignores the data on data lines D[1:0] to which it is coupled.

The peripheral blocks 104a and 104c also share a clock line 114. More particularly, both peripheral blocks 104a and 104c use clock line CLK[0]. As noted above in the example, the peripheral blocks 104a and 104 use different clock signals (e.g., 15 megahertz versus 50 megahertz signals). Particularly because of the different clock signals used, the chip select lines CS[0] and CS[2] are used to prevent both peripheral blocks 104a and 104c from attempting to use the same clock line CLK[0] simultaneously, which could lead to erroneous communication. In other embodiments, where multiple peripheral blocks 104 use the same clock signal, the clock line can be shared by the peripheral blocks 104 at the same moment in time, rather than over mutually exclusive (non-overlapping) time periods through time-multiplexing.

As noted above, in some embodiments, rather than a chip select line, one or more peripheral blocks 104 (e.g., peripheral blocks 104d and 104e) monitor certain data lines 112 for a particular chip enable code and disable code. This alternative chip select approach similarly prevents simultaneous use of shared lines by different peripheral blocks 104.

The sharing of the data lines 112 and clock lines 114 allows for a reduction in pins on the controller 102. For example, since peripheral blocks 104a and 104c share data lines D[1:0] rather than having separate data lines (e.g., D[3:0] and D[6:4]), two fewer data pins are required on the controller 102. Having fewer pins can reduce the cost, size, and complexity of the controller 102. For example, in the example of FIG. 1, the peripheral blocks 104 have a combined total of twenty data pins. Rather than having twenty separate data pins on the controller 102, one for each data pin of the peripheral blocks 104, the controller 102 has eight data pins. Each of the eight data pins is associated with one of the data lines D[7:0], which are shared among the peripheral blocks 104. Shared lines result in the controller 102 having fewer data pins for the shared lines than the cumulative total of data pins on the peripheral blocks 104 for the shared lines. In other words, taking as an example one shared line between the controller 102 and two of the peripheral blocks 104, the controller 102 would have one pin for the shared line, while the cumulative total of pins on the peripheral blocks 104 would be two, one on each peripheral block 104 to connect to the shared line.

FIG. 6C illustrates another exemplary interface configuration for communicating with the peripheral blocks 104. After communicating with the peripheral block 104c (see FIG. 6B), the controller 102 receives requests to communicate with peripheral blocks 104a, 104b, and 104e. The state machine 158 obtains interface profiles 162 associated with each of the peripheral blocks 104a, 104b, and 104e, configures the input/output interface 160 accordingly. In the example of FIG. 6C, the controller 102 may cycle sequentially between communicating with each of the peripheral blocks 104a, 104b, and 104e. For example, the DMA 152 may access and provide data from the memory 154 to the input/output interface 160 for providing to the peripheral block 104a, then access and provide data from the memory 154 to the input/output interface 160 for providing to the peripheral block 104b, and then access and provide data from the memory 154 to the input/output interface 160 for providing to the peripheral block 104c. The controller 102 may start and complete each data transfer to each peripheral block 104 before moving on to the next peripheral block 104, or the controller 102 may interweave transmissions of the data to the peripheral blocks 104.

In some embodiments, two or more DMAs 152 and two or more memories 154 are provided in the controller 102 and coupled to the communications bus 161. Each additional DMA 152 and memory 154 is operable to provide or receive a data stream to or from the peripheral drivers 164 of the input/output interface 160. Accordingly, an additional DMA 152 enables data transfers between the controller 102 and the peripheral blocks 104 to occur in parallel. For example, additional DMAs 152 enable tandem communication between the controller 102 and the peripheral blocks 104a, 104b, and 104e simultaneously because these blocks do not share data lines 112, clock lines 114, or chip select lines 116.

Figure 7:
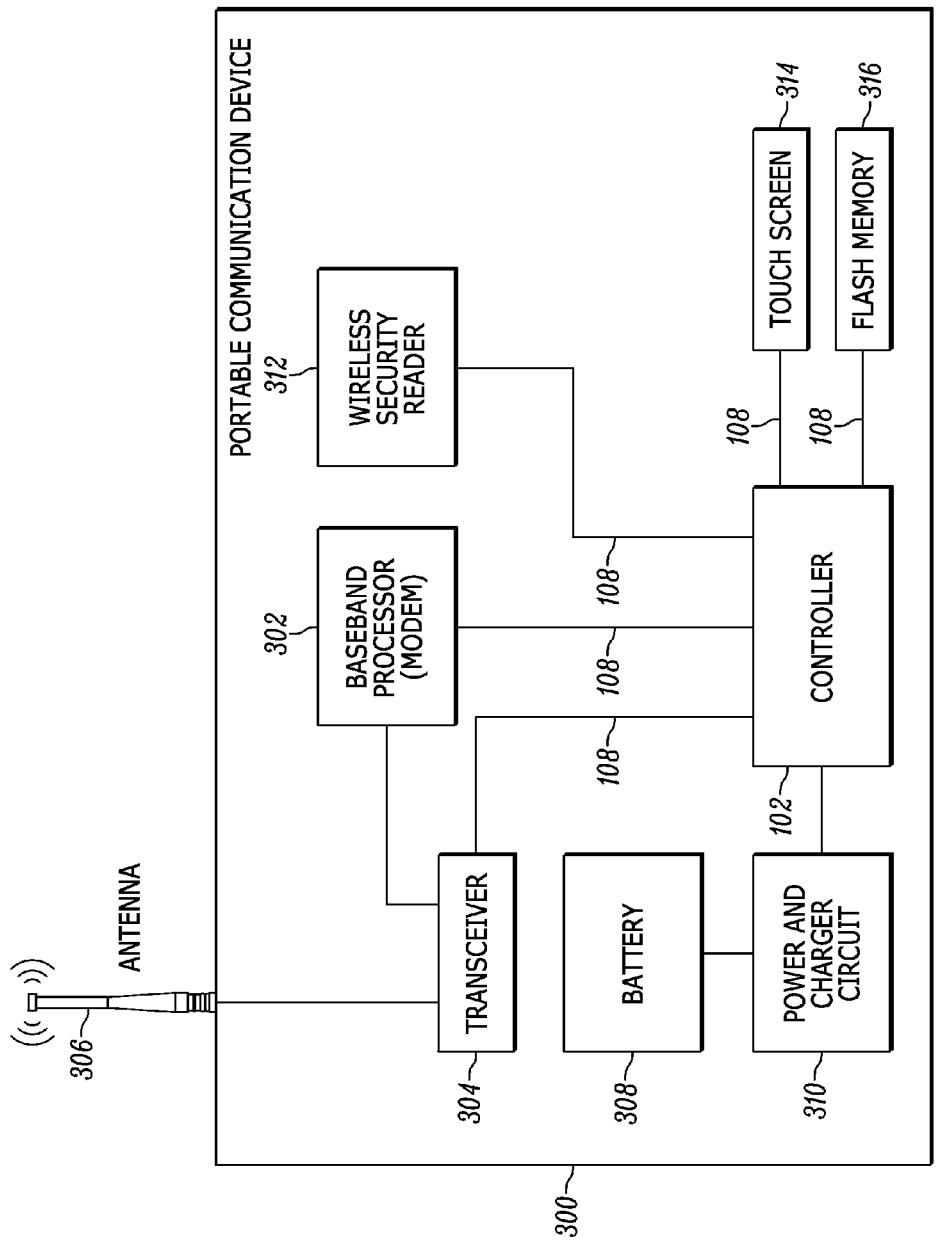
FIG. 7 illustrates a portable communication device incorporating the processing system of FIG. 1 in accordance with some embodiments.

In some embodiments, the controller 102 is used within a portable communication device 300, such as illustrated in FIG. 7. The portable communication device 300 includes a baseband processor 302 (e.g., a network modem), a transceiver 304, an antenna 306, a battery 308, a power and charger circuit 310, a wireless security reader 312, a touch screen 314, and flash memory 316. The portable communication device 300 terminates and originates voice and data communications over a wireless communications network via the transceiver 304 and the antenna 306. In some embodiments, the portable communication device 300 is a portable two-way radio. However, in alternative embodiments, the portable communication device 300 is a cellular telephone, a smart telephone, a smart watch, a tablet computer, a personal digital assistant (PDA), or another device.

The baseband processor 302, transceiver 304, antenna 306, wireless security reader 312, touch screen 314, and flash memory 316 are example peripheral blocks 104 with which the controller 102 communicates.

The baseband processor 302 is configured to encode and decode digital data sent and received by the transceiver 304 to and from a wireless communications network via the antenna 306. The battery 308 provides electrical power to the various components of the portable communication device 300 through the power and charger circuit 310. The battery 308 is rechargeable and receives power from the power and charger circuit 310.

The wireless security reader 312 is a very short-range wireless receiver. The wireless security reader 312 receives data from wireless security devices (e.g., tags and keycards). Examples of a wireless security reader 312 include a near field communication (NFC) reader and a radio-frequency identification (RFID) reader. The wireless security reader 312 is configured to receive data, including authentication tokens, from wireless security devices associated with, for example, a user.

The touch screen 314 may include a graphical user interface (GUI) (e.g., generated by the controller 102 and presented on a touch screen 314) that enables a user to interact with the portable communication device 300. The flash memory 316 provides additional data storage for the portable communication device 300, which may be used for storing audio data, image data, video data, user data, as well as other types of data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A reconfigurable interface used to communicate with a plurality of peripheral digital subsystem blocks, the reconfigurable interface comprising:
an input/output interface including a plurality of data lines, the plurality of data lines selectively connecting the plurality of peripheral digital subsystem blocks;
a profile memory storing a plurality of interface profiles, each interface profile defining a configuration of the input/output interface to communicate with an associated one of the plurality of peripheral digital subsystem blocks; and
a state machine coupled to the profile memory and to the input/output interface, the state machine configured to, in response to a first request to communicate with a first peripheral digital subsystem block, configure the input/output interface according to a first interface profile of the plurality of interface profiles to enable communicating with the first peripheral digital subsystem block over a first portion of the plurality of data lines, the first portion of the plurality of data lines including at least one shared data line, and to, in response to a second request to communicate with a second peripheral digital subsystem block, configure the input/output interface according to a second interface profile of the plurality of interface profiles to enable communicating with the second peripheral digital subsystem block over a second portion of the plurality of data lines, the second portion of the plurality of data lines including the at least one shared data line and at least one unshared data line separate from the first portion of the plurality of data lines.

2. The reconfigurable interface of claim 1, wherein the input/output interface further includes a plurality of chip select lines including a first chip select line connected to the first peripheral digital subsystem block and a second chip select line connected to the second peripheral digital subsystem block, the first chip select line asserted in response to the first request to communicate and the second chip select line asserted in response to the second request to communicate.

3. The reconfigurable interface of claim 1, wherein a first portion of the plurality of data lines is coupled to the first peripheral digital subsystem block and, in response to the first request to communicate, the input/output interface sends, via the first portion of the plurality of data lines, a chip enable code to the first peripheral digital subsystem block followed by a data payload.

4. The reconfigurable interface of claim 1,
wherein the input/output interface further includes a plurality of clock lines including a first clock line connecting the reconfigurable interface to the first peripheral digital subsystem block and a second clock line connecting the reconfigurable interface to the second peripheral digital subsystem block, and
wherein the first clock line has a first clock frequency in accordance with the first interface profile and the second clock line has a second clock frequency in accordance with the second interface profile.

5. The reconfigurable interface of claim 1, wherein the input/output interface further includes a shared clock line connecting the reconfigurable interface to the first peripheral digital subsystem block and the second peripheral digital subsystem block, the shared clock line having a first clock frequency in a first time period and a second clock frequency in a second time period.

6. The reconfigurable interface of claim 1, wherein, based on the first interface profile, the input/output interface is configured for asynchronous communication with the first peripheral digital subsystem block.

7. The reconfigurable interface of claim 1, wherein the input/output interface further includes a multiplexing unit having
mux select lines coupled to the state machine,
data outputs coupled to the plurality of data lines,
data inputs coupled to peripheral driver blocks,
clock outputs coupled to a plurality of clock lines, and
clock inputs coupled to the peripheral driver blocks.

8. The reconfigurable interface of claim 1, wherein the input/output interface further includes a plurality of peripheral driver blocks, each peripheral driver block associated with one of the plurality of peripheral digital subsystem blocks.

9. The reconfigurable interface of claim 1, wherein the first peripheral digital subsystem block and the second peripheral digital subsystem block cumulatively include more data pins coupled to the at least one shared data line than the reconfigurable interface has coupled to the at least one shared data line.

10. The reconfigurable interface of claim 9,
wherein the input/output interface further includes a plurality of clock lines, the plurality of clocks lines including a shared portion of clock lines that are shared among the plurality of peripheral digital subsystem blocks, and
wherein the first peripheral digital subsystem block and the second peripheral digital subsystem block cumulatively include more clock pins coupled to the shared portion of clocks lines than the reconfigurable interface has coupled to the shared portion of clock lines.

11. The reconfigurable interface of claim 1, wherein the state machine is further configured to,
receive subsequent requests to communicate with additional peripheral digital subsystem blocks of the plurality of peripheral digital subsystem blocks, and,
in response to each request of the subsequent requests, configure the input/output interface according to an interface profile of the plurality of interface profiles.

12. A method of reconfiguring a reconfigurable interface used to communicate with a plurality of peripheral digital subsystem blocks, the method comprising:
receiving a first request to communicate with a first peripheral digital subsystem block;
in response to receiving the first request,
configuring an input/output interface of the reconfigurable interface according to a first interface profile, and
communicating with the first peripheral digital subsystem block over a first portion of data lines of the input/output interface; and
receiving a second request to communicate with a second peripheral digital subsystem block;
in response to receiving the second request,
configuring the input/output interface of the reconfigurable interface according to a second interface profile, and
communicating with the second peripheral digital subsystem block over a second portion of data lines of the input/output interface, the second portion of data lines including at least one shared data line of the first portion of data lines and at least one unshared data line separate from the first portion of data lines
wherein configuring the input/output interface according to the first interface profile includes:
providing, by a state machine, multiplexor configuration signals to a multiplexing unit, and
connecting first driver lines from a first peripheral driver block to the first portion of data lines; and
wherein configuring the input/output interface according to the second interface profile includes:
providing, by the state machine, multiplexor configuration signals to the multiplexing unit, and
connecting second driver lines from a second peripheral driver block to the second portion of data lines.

13. The method of claim 12, wherein configuring the input/output interface according to the first interface profile includes enabling the first peripheral digital subsystem block, and wherein configuring the input/output interface according to the second interface profile includes enabling the second peripheral digital subsystem block.

14. The method of claim 13, wherein enabling the first peripheral digital subsystem block includes asserting a chip select line of the first peripheral digital subsystem block.

15. The method of claim 13, further comprising disabling the first peripheral digital subsystem block before enabling the second peripheral digital subsystem block.

16. The method of claim 13, wherein enabling the first peripheral digital subsystem block includes the input/output interface sending, via the first portion of data lines, a chip enable code to the first peripheral digital subsystem block before sending a data payload.

17. The method of claim 12, wherein configuring the input/output interface according to the first interface profile includes generating a first clock signal having a first clock frequency, and wherein configuring the input/output interface according to the second interface profile includes generating a second clock signal having a second clock frequency.

18. The method of claim 17, wherein the first clock signal is sent over a clock line to the first peripheral digital subsystem block in a first time period, and the second clock signal is sent over the clock line to the second peripheral digital subsystem block in a second time period.

19. The method of claim 12, wherein communicating with the first peripheral digital subsystem block over the first portion of data lines includes asynchronous communication.

20. The method of claim 12, wherein configuring the input/output interface according to the first interface profile includes:
providing, by the state machine, driver configuration signals to the input/output interface, and
selecting the first peripheral driver block of the input/output interface to communicate with the first peripheral digital subsystem block.

21. The method of claim 12, further comprising:
receiving subsequent requests to communicate with additional peripheral digital subsystem blocks of the plurality of peripheral digital subsystem blocks, and, in response to each request of the subsequent requests, configuring the input/output interface according to an interface profile of the plurality of interface profiles.

22. A method of reconfiguring a reconfigurable interface used to communicate with a plurality of peripheral digital subsystem blocks, the method comprising:

receiving a first request to communicate with a first peripheral digital subsystem block;

in response to receiving the first request, configuring an input/output interface of the reconfigurable interface according to a first interface profile, and communicating with the first peripheral digital subsystem block over a first portion of data lines of the input/output interface; and receiving a second request to communicate with a second peripheral digital subsystem block;

in response to receiving the second request, configuring the input/output interface of the reconfigurable interface according to a second interface profile, and communicating with the second peripheral digital subsystem block over a second portion of data lines of the input/output interface, the second portion of data lines including at least one shared data line of the first portion of data lines and at least one unshared data line separate from the first portion of data lines, wherein configuring the input/output interface according to the first interface profile includes:

providing, by a state machine, driver configuration signals to the input/output interface, and selecting a peripheral driver block of the input/output interface to communicate with the first peripheral digital subsystem block.

* * * * *